Oct. 30, 1928.  
F. J. SMITH  
LEAF SPRING  
Filed June 14, 1926
1,689,303
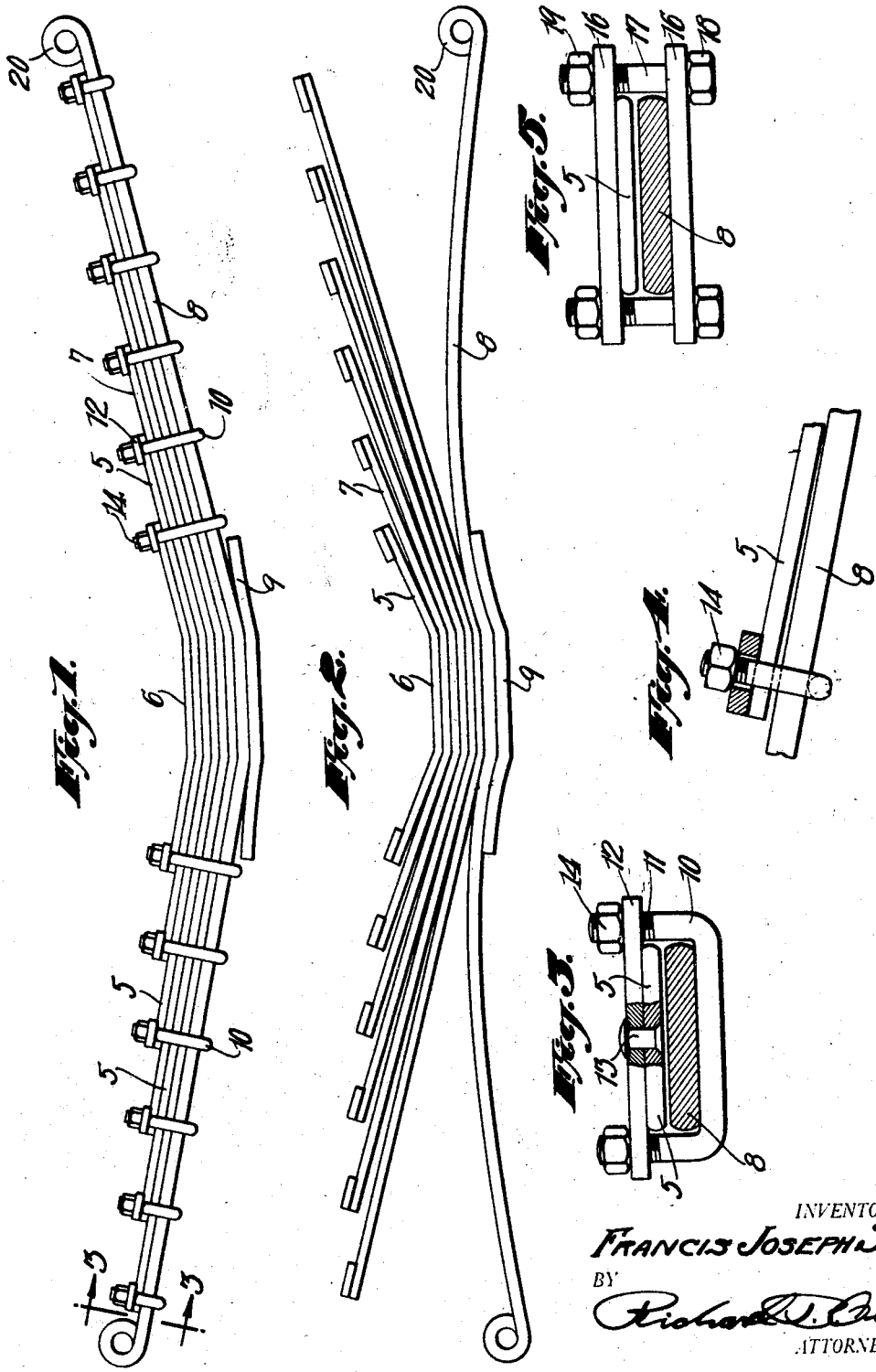
INVENTOR.  
FRANCIS JOSEPH SMITH.  
BY  
ATTORNEY.

Patented Oct. 30, 1928.

1,689,303

UNITED STATES PATENT OFFICE.

FRANCIS J. SMITH, OF GARY, INDIANA.

LEAF SPRING.

Application filed June 14, 1926. Serial No. 116,034.

This invention relates to leaf springs and in particular to an improved construction thereof which will be more efficient, and will be less liable to break down under a load than the leaf springs now in common use.

A particular object of the invention is the reduction of the inherent inertia of suspension springs.

In the past, the only major factors entering into the calculation of spring vibration frequency were the spring rate and the suspended load, vibration frequency and therefore riding comfort depended solely on the strength of springs and the weight of its load.

A particular object, therefore, of my invention is to provide a spring in which the new factor, inertia, or the resistance offered by the spring to the beginning of vibration is considered and is treated as a major factor whereby a spring is designed to take care of this inertia and reduce the same in suspension springs. A fully loaded car rides more comfortably than a lightly loaded one, this fact being well known, and the reason for this is the increased inertia in the load, provided by the increased load on the spring. The same result can be had by decreasing the inertia of the spring as is had by increasing the inertia of the load, the object, therefore, is to increase greatly the vibration frequency by reducing greatly the inherent inertia of suspension springs.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in side elevation of my improved spring, the same being assembled and ready for use.

Figure 2 is a disconnected view of the leaves making up the spring, showing the shape of each leaf before they are drawn into position against each other.

Figure 3 is a sectional view, taken on the line 3—3 of Figure 1 and shows the connection between the upper leaves and the main leaf through the medium of the clip and rivet.

Figure 4 is a side view in elevation, a part thereof being shown in section, to show the connection between the upper leaf and the lower or main leaf, and, Figure 5 is a showing of a modified form of clip which is used to hold the main leaf and its auxiliary or upper leaves in proper relation with each other.

Referring to the drawings in detail, 5 indicates a plurality of leaves which are shaped to provide a horizontal portion 6 at their center and obliquely disposed ends 7, these leaves being of greater length as they approach the lower or main leaf 8. In the construction shown in Figure 1, the spring has been assembled but before its assembly, the leaves under normal assembled position would be arranged as shown in Figure 2, and it will be noted in this respect that the obliquely disposed portions or extended ends of the leaves 7 are in a straight line, being so arranged that they are diverging one from another. The main leaf spring 8 in this instance, being curved so that it will give the proper resistance to the load to be carried.

The main leaf spring 8 is seated in a suitable short auxiliary leaf 9 or saddle, which adds to the strength of said main leaf 8 and is of substantially the same thickness as said leaf.

It will be particularly noted in my construction that the auxiliary leaves 5 are not as heavy as the main leaf 8, which is the binder and bears the majority of the load to be carried. In Figure 1, the leaves are shown assembled to the main leaf 8 at their ends through the medium of the suitable clip 10 which are U-shaped and have their ends threaded as at 11 to pass through a suitable plate 12. This plate is riveted as at 13 to the end of the leaves 5. This bolt is provided on its threaded ends 11 with the nuts 14, which when drawn upon, bring the leaves into suitable relation, it being understood that they may be drawn up as close as desired or against each other depending upon the conditions under which the spring is to operate. The outer ends of the leaves are provided with the suitable plates 12, as before mentioned, and the bolt 10 surrounds the leaves in spaced relation so that plenty of clearance is allowed around the leaf edges whereby longitudinal movement of the leaves may occur without opposition or strain.

In Figure 5 I have shown a modified form which contemplates the use of a plurality of plates 16 which are joined by the bolts 17, which at one end are provided with the hexagon head 18 and at the other end with the nut 19 whereby the springs may be drawn into proper relation and maintained in such relation during the working thereof. The ends of the main leaf 8 are provided with an eye 20 which may engage the suitable strap which connects the springs to the work with which they are to be identified.

Regarding the theory of my improved spring, it will be noted that the order of leaves is reversed and the main leaf is beneath the main portion of the spring and that each leaf of the group is arranged on each end to accommodate the shackle-bolt which connects it with its work. This arrangement pratically wipes out inter-leaf friction, noise, the need for oil and other complications resulting from a multiplicity of leaves and as met with in the spring construction now in common use. The main leaf 8 is sufficiently heavy to support about twice as much load as one of the auxiliary or upper leaves 5. The auxiliary leaf 9, being of the same material and of the same proportion, its shape, of course, is determined by figuring the shape that the spring, as a whole, will assume when loaded fully.

With the main leaf and its auxiliary shaped in this way, the auxiliary springs 5 alone figure in the inertia of the entire spring as long as the spring is not fully loaded. For instance, if the springs 5 or group, as they may be termed, have a strength of sixty pounds per inch of flexure and the main leaf, a strength of twenty pounds per inch, the strength of the entire spring after movement started would be eighty pounds per inch of flexure, but the inertia of this spring would be equal to the inertia of a sixty pound spring as long as the spring was not fully loaded, that is, it would offer the same resistance to the beginning of vibration.

It will be noted that the entire working length of the leaves 5, see Figure 2, is flat or straight. Straight leaves are more flexible and have lower inertia than ones that are arched toward their load. It will be remembered here that all spring action is allowed by the stretching of the molecules on one side of the leaves and the compression of the molecules on the other side and that molecules of steel do not offer the same resistance to stretching that they do to compression. For instance, if a short bar of steel one inch square be subjected to a pull of one hundred thousand pounds, the resulting elongation will be equal to .08 inch per inch of length and if a similar bar be subjected to an end compression of one hundred thousand pounds, the resulting loss of length will be only about one-half of the result of the former experiment. Therefore, the work is not evenly divided between the two sides of the spring and the line of neutrality between stretching and compression is shifted toward the compression side in order to equalize the output of the opposing sides. This shifting of the neutral line has the effect of increasing the thickness of the leaf with the corresponding increase in stiffness. The common practice of arching the leaves of a spring still further shifts this neutral line by arranging the larger number of molecules on the compression side than on the tension side, thus the neutral line is drawn still further toward the compression side with the attendant complication.

It will be evident, therefore, that I have overcome these conditions and have provided a spring wherein the inherent inertia of suspension springs is reduced by increasing greatly the vibration frequency so that riding comfort is increased and under heavy loads, the vehicle or car body suspended upon the springs, will ride more evenly and the springs will be less liable to breakage than has heretofore been the case.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:—

A suspension spring comprising a group of graduated, flat leaves arranged to be loaded from beneath and a heavy, main leaf, whose normal shape when not carrying a load, approximates the shape of the rest of the spring after a load has been applied thereto.

In testimony whereof I affix my signature.

FRANCIS J. SMITH. [L. S.]